United States Patent
Hübel

(10) Patent No.: US 11,740,130 B2
(45) Date of Patent: Aug. 29, 2023

(54) METHOD AND SYSTEM FOR ASCERTAINING A HUE

(71) Applicant: Hubergroup Deutschland GmbH, Kirchheim-Heimstetten Bayern (DE)

(72) Inventor: Patrick Hübel, Poing (DE)

(73) Assignee: HUBERGROUP DEUTSCHLAND GMBH, Kirchheim-Heimstetten Bayern (DE)

(*) Notice: Subject to any disclaimer, the term of this patent is extended or adjusted under 35 U.S.C. 154(b) by 199 days.

(21) Appl. No.: 17/262,655

(22) PCT Filed: Jul. 11, 2019

(86) PCT No.: PCT/EP2019/068759
§ 371 (c)(1),
(2) Date: Jan. 22, 2021

(87) PCT Pub. No.: WO2020/020659
PCT Pub. Date: Jan. 30, 2020

(65) Prior Publication Data
US 2021/0325249 A1    Oct. 21, 2021

(30) Foreign Application Priority Data
Jul. 27, 2018   (EP) .................................... 18186165

(51) Int. Cl.
*G01J 3/46* (2006.01)
(52) U.S. Cl.
CPC ......... *G01J 3/463* (2013.01); *G01J 2003/467* (2013.01)
(58) Field of Classification Search
CPC .................... G01J 3/463; G01J 2003/467
See application file for complete search history.

(56) References Cited

U.S. PATENT DOCUMENTS

| 6,330,342 | B1 | 12/2001 | Winter |
| 7,034,960 | B2 | 4/2006 | Stone et al. |
| 2004/0093112 | A1 | 5/2004 | Marchand et al. |
| 2006/0012810 | A1* | 1/2006 | Postle ............ G01J 3/465 358/1.9 |
| 2010/0067056 | A1 | 3/2010 | Rich et al. |
| 2015/0120492 | A1 | 4/2015 | Somerville et al. |

FOREIGN PATENT DOCUMENTS

| EP | 1248087 A1 | 10/2002 |
| EP | 2149038 A1 | 2/2010 |
| WO | 2008024295 A2 | 2/2008 |
| WO | 2008150378 A1 | 12/2008 |
| WO | 2010/036874 A1 | 4/2010 |

OTHER PUBLICATIONS

International Search Report for corresponding PCT Application No. PCT/EP2019/068759 dated Oct. 16, 2019.
Office Action dated Nov. 18, 2022 in Russian Patent Application No. 2021100508/28 (000884).

* cited by examiner

*Primary Examiner* — Jamil Ahmed
(74) *Attorney, Agent, or Firm* — Wood, Phillips, Katz, Clark & Mortimer

(57) ABSTRACT

The invention relates to a system and a method for ascertaining a color recipe which produces a color product with a specified hue after an application onto a specified substrate using a specified application method. The method has the steps of: a) providing a database with a plurality of data sets, b) specifying a target application method, a target substrate, and a desired target hue by means of a user, c) searching the database using a computer program, and d) when at least one suitable database has been found in step c), displaying the information stored in the at least one data set, said information relating to the color recipe, wherein at least one of the data sets also comprises information on at least one reference hue, a reference application method, and a reference substrate. The reference hue is produced when the color recipe to which information contained in the data set relates is applied onto the reference substrate using the reference application method, and the reference application method differs from the application method to which the information contained in the data set relates and/or the reference substrate differs from the substrate to which information contained in the data set relates.

13 Claims, No Drawings

METHOD AND SYSTEM FOR ASCERTAINING A HUE

FIELD OF THE INVENTION

The present invention relates to a system as well as a method for ascertaining a color recipe, which after application using a specified application method, such as a flat printing method, on a specified substrate, such as paper, results in a color product, such as printed paper, with a specified hue.

BACKGROUND OF THE INVENTION

Such systems and methods are used for a wide variety of applications, including in packaging development. For example, when developing packaging, such as food packaging, a new, colorful, multi-color design is created, the exact production of which requires that the colors specified by the packaging developer can be exactly realized when printing the packaging with the color recipes used to reproduce the different colors. However, the hue achieved after the application of a color recipe using an application method, i.e. in the case of printing, the hue achieved after printing a printing ink onto a substrate, depends on a number of factors, in particular on the specific type of substrate and on the application method used. Printing a printing ink with flexographic printing on paperboard can result in a printed product with a significantly different hue than, for example, printing the same printing ink on coated paper using a gravure printing method. In addition, a known gravure printing ink for paper, which produces the hue required by the packaging developer, when applied to the desired packaging board using a gravure printing method, will not lead to the desired hue. It is therefore necessary to find a printing ink that gives the desired hue for the specific substrate and the desired printing method, or, if not already available, it has to be developed.

In addition to the desired hue resulting after application to the target substrate using the specified application method, the color recipe that is suitable for a new application, such as for a new packaging, must meet a variety of other criteria. Depending on the application, the color recipe must, for example, have a specified gloss value and be characterized by a more or less pronounced chemical resistance or a more or less pronounced resistance to light, to name just a few of the required requirements.

In order to make it easier for packaging developers and other users to find a suitable color recipe for a specific system despite these complex relationships, databases and computer programs have already been developed that allow a user to specify desired target parameters such as the target hue, the substrate, the application method with which the color recipe is to be applied on the substrate, the required chemical resistance of the color product obtained after the application of the color recipe to the substrate, and other parameters. The computer program then searches the database for a suitable color recipe and displays the color recipe which, according to the information stored in the database, after application to the target substrate using the specified application method, results in a color product with a hue that comes closest to the required target hue. If no color recipe is found which at least approximately results in the desired target hue, the user is shown that no hit was found.

Such a method and system is sold, for example, under the trade name PantoneLIVE.

From U.S. Pat. No. 7,034,960 B2 a method of using a database to develop a color product is known, the method comprising the steps of: i) storing development information in the database, wherein the development information comprises properties related to the development of a plurality of color products, ii) receiving first color information comprising at least a first color, iii) identifying first development information in the database, wherein the first development information includes at least the first color, iv) receiving at least one physical property of the color product and v) using the first development information to determine whether the at least one physical property is compatible with the first color. If the at least one physical property is not compatible with the first color, the method is either terminated or a warning is displayed to the user that at least one physical property is not compatible with the first color. The user can then change his desired design or the requirements placed on the color product until a corresponding hit for a color recipe is found in the database. The latter, however, is not a satisfactory solution, since in this case the user does not receive a color recipe which results in the color product that is desired at the outset.

After the user receives a color recipe for his planned color product from a specific substrate to which the color recipe is applied using a specific application method, this color recipe is usually forwarded to a color manufacturer—possibly located in another part of the world—so that he can then manufacture the color. Usually, the user is shown the color recipe as a mixture recipe of several semi-finished products, which are sold commercially, for example, by the distributor of the computer program with which the color recipe was ascertained using an aforementioned method. Such a color recipe can for example consist of two to five colorants and a non-coloring blend. Each of the colorants contains one or more pigments, which are dispersed, for example, in a solvent and/or binder, whereas the non-coloring blend may contain one or more binders, such as alkyd resin, and/or one or more solvents, such as mineral oil or vegetable oil. In the case of offset printing inks, the blend is also referred to as varnish. The color manufacturer mixes these components together to form the color recipe. One problem with this, however, is that it is very costly for the color manufacturer to carry out a reliable quality control of the color recipe produced, since it is necessary to apply the color recipe to the specified substrate using the specified application method before the hue of the color product obtained in this way is compared with the specified target hue. As a rule, however, the color manufacturer only has laboratory application methods available and often the customer substrate is not available to him either. If the discrepancy between the specified target hue and the hue obtained for the production batch is too great, the color manufacturer must correct the production batch by adding appropriate quantities of one or more of the semi-finished products afterward.

BRIEF SUMMARY OF THE INVENTION

Proceeding from this, the present invention was based on the object of providing a system and a method for ascertaining a color recipe which, after application using a specified application method on a specified substrate, results in a color product with a specified hue, wherein the system and the method make it possible to produce the ascertained color recipe easily and to subject the produced color recipe to a simple and reliable quality control.

According to the invention, this object is achieved by a method for ascertaining a color recipe which, after application using a specified application method on a specified substrate, results in a color product with a specified hue, the method comprising:

a) providing a database in which a plurality of data sets are stored, wherein each of the data sets in each case includes at least information about a color recipe, about a substrate, about an application method and about the hue of the color product resulting after the application of the color recipe using the application method on the substrate, b) specification by a user of a target application method, of a target substrate and of a desired target hue that results for the obtained color product after the application of a color recipe using the specified target application method on the specified target substrate, c) searching the database preferably with a computer program to see whether it contains at least one data set whose color recipe, about which information is contained in the data set, after application using the target application method specified in step b) onto the target substrate specified in step b), results in a color product with a hue which corresponds to the target hue specified in step b) or deviates from it at most by a specified tolerance, and d) if at least one suitable data set is found in step c), displaying the information about the color recipe stored in the at least one data set, wherein at least one of the data sets—in addition to the information stored in this about the color recipe, about the substrate, about the application method and about the hue of the color product resulting after the application of the color recipe using the application method on the substrate—also includes information about at least one reference hue, a reference application method and a reference substrate, wherein the reference hue is obtained when the color recipe about which information is contained in the data set is applied to the reference substrate specified in the data set using the reference application method specified in the data set, wherein the reference application method is different from the application method about which information is contained in the data set, and/or the reference substrate is different from the substrate about which information is contained in the data set.

In that at least one of the data sets, preferably a plurality of data sets and particularly preferably all data sets—in addition to the information stored in this about the color recipe, about the substrate, about the application method and about the hue of the color product resulting from the application of the color recipe using the application method onto the substrate—also include information about at least one reference hue, a reference application method and a reference substrate, wherein the reference hue is obtained when the color recipe about which information is contained in the data set is applied to the reference substrate using the reference application method, wherein the reference application method is different from the application method about which information is contained in the data set and/or the reference substrate differs from the substrate about which information is contained in the data set, a produced batch of the color recipe can simply be subjected to reliable quality control. It is only necessary to apply a corresponding amount of the manufactured batch of the color recipe to the reference substrate using the reference application method and then to compare the hue of the reference color product manufactured in this way with the reference hue about which information is contained in the data set. If the deviation obtained from this comparison is within a specified tolerance range, the batch can be released. Otherwise, this must be corrected by adding one or more components until a hue within the tolerance range is obtained for a reference color product manufactured with it.

DETAILED DESCRIPTION OF THE INVENTION

A particular advantage of the method according to the invention is that the quality control does not require the color manufacturer to apply the produced color recipe using the target application method specified by the customer (which usually requires a complex system) to the target substrate specified by the customer (possibly very special and commercially poorly available), but he only has to use a reference substrate, which is, for example, a standard paper available all over the world and common, with a reference application method (preferably simple and not requiring a complex system). Otherwise, the color manufacturer would have to procure the corresponding target substrate specified by the customer for each individual color recipe, which may not be available or may be very difficult to find at his location, and use the specific target application method specified by the customer. In this case, the color manufacturer, who produces a multitude of different color recipes, would need an enormously large warehouse with a multitude of different, possibly difficult to obtain target substrates as well as a multitude of different application systems, such as a web offset printing machine, a gravure printing machine and the like. According to the invention, on the other hand, a reference substrate and a reference application method may be sufficient if the same reference substrate and reference application method are stored for all color recipes available in the database. For different colors, especially different printing inks, however, it is advisable to choose different reference application methods for liquid and pasty colors, for example. These reference application methods can, for example, be a laboratory proofing device for offset inks (e.g. Prüfbau multipurpose test printing machine MZ II or MZE, IGT test proofing devices for offset inks, or the Mickle Ink Proofer), another laboratory proofing device for liquid printing inks, such as a laboratory tester 180 (nsm Norbert Schläfli AG), a flat-round proofing device with an engraved or etched plate, Pamarco Proofer, QD Proofing System from Harper Scientific, or a squeegee applicator (e.g. Erichsen squeegee applicator K Control Coater 623). If, for example, the reference application method is an offset printing method, the reference substrate is a common standard paper and the information about the reference hue is a reference spectral curve for the wavelength range from 180 to 4000 nm, such as in particular a reference spectral curve for the wavelength range from 400 to 700 nm, the color manufacturer must for the quality control simply print a corresponding amount of his production batch on the standard paper, record a spectral curve for the wavelength range from 180 to 4000 nm, preferably from 400 to 700 nm, from the surface of the color product thus obtained (i.e. the standard paper provided with the color recipe) and compare the spectral curve obtained in this way with the reference spectral curve. If the two spectral curves differ from one another by a maximum of a factor within a specified tolerance range, the production batch can be released. The use of standard paper also has the advantage that it ages less and is more durable than conventional paper.

In the context of the present invention, standard paper is understood to mean a paper which is standardized in a national or an international standard. Examples of suitable standard papers are specified in the DIN ISO 2846-1: 2017 standard. If, for example, liquid colors are applied to a transparent film, a standard paper can be placed underneath before the spectral curve is recorded in order to also ensure standardized conditions for recording the spectral curve.

In the context of the present invention, two or more identical hues are understood to mean that the two or more hues are viewed under the same light, preferably under the same standard light according to ISO 3664, or, for example, measured under the measurement conditions M0, M1, M2 or M3, are indistinguishable to the human eye and in particular do not deviate from one another by more than a $\Delta E_{00}$ value of 0.5 and preferably not by more than a $\Delta E_{00}$ value of 0.2. Furthermore, two or more identical hues are preferably to be understood as meaning that the two or more hues differ from one another by a dH* of a maximum of 0.5, particularly preferably a dH* of a maximum of 0.2. The parameters $\Delta E$ and dH* are defined in DIN EN ISO 11664-6: 2014.

According to the invention, the reference application method differs from the application method about which information is contained in the data set, and/or the reference substrate differs from the substrate about which information is contained in the data set. This includes three alternatives, namely: First, that the reference application method is different from the application method about which information is contained in the data set, but that the reference substrate is the same as the substrate. Second, that the reference substrate is different from the substrate about which information is contained in the data set, but that the reference application method is the same as the application method. Third, that the reference application method is different from the application method about which information is contained in the data set, and that the reference substrate is different from the substrate about which information is contained in the data set. This means that the reference hue stored in the data set will generally differ from the hue that is also stored in the data set and which is the result of applying the stored color recipe using the application method stored in the data set to the substrate stored in the data set, unless by chance, despite the difference between the application method and the reference application method or the difference between the substrate and the reference substrate, the same hue results in both applications.

In order to make good use of the advantages of the present invention, it is proposed in a further development of the concept according to the invention that at least 10%, preferably at least 50%, particularly preferably at least 80%, more preferably at least 90%, very particularly preferably at least 95% and most preferably all the data sets—in addition to the information stored in these about the color recipe, about the substrate, about the application method and about the hue of the color product resulting after the application of the color recipe using the application method on the substrate—include information about at least one reference hue and the associated reference application method and the associated reference substrate.

In a further development of the concept according to the invention, it is proposed that in the above embodiment, the same reference substrate is stored in all data sets in which a reference substrate is stored and/or the relevant reference application method is stored in all data sets in which a reference application method is stored. This allows a color recipe manufacturer to use the same reference substrate for all color recipes stored in the database for quality control.

The present invention is not particularly limited with regard to the number of reference hues contained per data set. Therefore, some of the data sets can each contain information about a reference hue and the associated reference application method and the associated reference substrate and other data sets can each contain information about two or more different reference hues as well as the associated reference application methods and reference substrates, which each result in the same target hue using a different application method and/or on a different substrate.

According to a first variant of this embodiment, the at least one data set of the database includes information about exactly one reference hue and the associated reference application method and the associated reference substrate. Preferably at least 10%, preferably at least 50%, particularly preferably at least 80%, more preferably at least 90%, very particularly preferably at least 95% and most preferably all of the data sets contain information about exactly one reference hue and the associated reference application method and the associated reference substrate.

According to a second variant of this embodiment, the at least one data set of the database includes information about two different reference hues and the respective reference application methods and reference substrates associated therewith, the first reference hue being obtained when the color recipe about which information is contained in the data set is applied using a first reference application method onto a first reference substrate, and the second reference hue is obtained when the color recipe about which information is contained in the data set is applied to a second reference substrate using a second reference application method, wherein the first reference application method is different from the second reference application method and/or the first reference substrate is different from the second reference substrate. Preferably at least 10%, preferably at least 50%, particularly preferably at least 80%, more preferably at least 90%, very particularly preferably at least 95% and most preferably all of the data sets contain information about two different reference hues as well as the respective reference application methods and reference substrates associated therewith.

According to a third variant of this embodiment, the at least one data set in the database includes information about more than two different reference hues. Preferably at least 10%, preferably at least 50%, particularly preferably at least 80%, further preferably at least 90%, very particularly preferably at least 95% and most preferably all of the data sets comprise information about more than two different reference hues.

According to a fourth variant of this embodiment, some of the data sets in the database contain information about precisely one reference hue, whereas the other part of the data sets contains information about two or more reference hues.

In the context of the present invention, information stored in the data sets about the at least one reference hue is understood to mean all types of information that uniquely characterize the reference hue.

According to a particularly preferred embodiment of the present invention, the information about the reference hue is the data of a spectral curve that has been obtained by applying the color recipe stored in the relevant data set using the reference application method on the reference substrate and then recording a spectral curve from the surface of the resulting color product with a spectrophotometer over a wavelength range from 180 to 4000 nm. The recorded spectral curve is particularly preferably a spectral reflection curve recorded over a wavelength range from 400 to 700 nm. The spectral reflection curve can be recorded in such a way that the overall reflection, the total reflection, the diffuse reflection or the directed reflection is measured. The light spectrum is preferably radiated onto the color product to be measured at a first angle and the reflection is measured with a sensor at a second angle. For example, the light source can radiate the light spectrum at an angle of 45° onto the color product and the sensor can measure the reflection at 0°, wherein both angles are meant in relation to the vertical, i.e. the plane perpendicular to the color product surface, so 0° corresponds to the vertical. Alternatively, the light source can radiate the light spectrum at an angle of 0° onto the color product and the sensor can measure the reflection at 45°, or the light source can radiate the light spectrum diffusely onto the color product and the sensor can measure the reflection at 0°, 8° or any other angle. The data of the spectral curve in this embodiment of the present invention can be the reflection values for every nanometer in the measured wavelength range, the reflection values for every fifth nanometer in the measured wavelength range, the reflection values for every tenth nanometer in the measured wavelength range or the reflection values at other intervals.

According to an alternative embodiment of the present invention, the information about the reference hue can also be the values in a color space which correspond to the reference hue. According to this embodiment, the information about the reference hue is preferably the lab values of the reference hue. Alternatively, the values from other color spaces can also be used, such as LUV values, RGB values, LCh values, XYZ values or the like.

The above statements on the reference hue and the information stored in the data sets of the database apply equally to each of the hues stored in the data sets and to the target hue to be entered in step b) of the method according to the invention. Thus, the information contained in the data sets about the hue, or the target hue to be specified by the user in step b), can in each case be the data of a spectral curve recorded over a wavelength range from 180 to 4000 nm and preferably over a wavelength range from 400 to 700 nm, such as in particular a spectral reflection curve, or can be the lab values of the hue or the like.

In addition to the information about the at least one reference hue, the corresponding data sets contain information about the reference application method and the reference substrate, from which the reference hue results by applying the color recipe about which information is contained in these data sets using the reference application method to the reference substrate. While the information on the reference application method includes the specification of the reference application method, such as web offset printing, the specification of a number and/or letter code or text or the like identifying the reference application method, the information on the reference substrate is, for example, the specification of the reference substrate, such as a special standard paper, the specification of a number and/or letter code or text identifying the reference substrate or is the data of a spectral curve recorded over a wavelength range from 180 to 4000 nm, preferably from 400 to 700 nm, such as in particular a spectral reflection curve, or is the lab values of the reference substrate or the like.

The present invention is not restricted with regard to the type of reference application method about which information is contained in the data sets of the database. The reference application method can therefore be any application method with which a color recipe can be applied to a substrate. For example, the reference application method about which information is contained in the data sets in the database can be an application method selected from the group that consists of printing methods, leather dyeing processes, textile dyeing processes, painting, rolling, spraying, dipping, roller coating, flooding, glazing, powder coating, enameling and any combination of two or more of the above methods. The reference application method about which information is contained in the data sets of the database is preferably one which is selected from flat printing, gravure printing, flexographic printing, digital printing, screen printing, letterpress printing, pad printing, transfer printing, sublimation printing, collotype printing, leather dyeing processes, textile dyeing processes, and any combination of two or more of the above methods. Examples of flat printing are sheet-fed offset printing, web offset printing, stone printing, lithographic printing, whereas examples of digital printing are xerography and inkjet.

The above statements on the reference application method and information stored on this in the data sets of the database equally apply for the application methods stored in the data sets for the hue and for the target application methods to be entered in step b) of the method according to the invention. Thus, the information on the application method contained in the data sets or the target application method to be specified by the user in step b) can therefore be the specification of the application method, the specification of a numerical and/or number code or text or the like that identifies the application method, wherein the application method or the target application methods may be selected from the same group of methods as described above.

The present invention is not particularly restricted with regard to the type of reference substrate about which information is contained in the data sets of the database. The reference substrate can therefore be any substrate to which a color recipe can be applied using an application method. For example, the reference substrate can be a substrate selected from the group consisting of paper, cardboard, paperboard, plastics film, leather, textile, metal, wood, glass, ceramics, skin, metallized surfaces, concrete, plastics bodies, laminates, composite materials and any combination of two or more of the above substrates. The reference substrate is preferably selected from the group consisting of newsprint, uncoated paper, coated paper, cardboard, paperboard, corrugated cardboard, plastics film (for example made of PE polyethylene, OPP polypropylene, OPA polyimide, PVC polyvinyl chloride, PET polyethylene terephthalate, PLA polylactide film), felts, nonwovens, laminates made of plastics and aluminum film, leather, textile and any combination of two or more of the above substrates.

The above statements on the reference substrate and the information stored on this in the data sets of the database equally apply for the substrates stored in the data sets for the hue and for the target substrate to be entered in step b) of the method according to the invention. The information on the substrate contained in the data sets or the target substrate to be specified by the user in step b) can each be the specification of the substrate, such as a special standard paper, the specification of a numerical and/or letter code or text identifying the substrate, the data of a spectral curve recorded over a wavelength range of 180 up to 4000 nm, preferably from 400 to 700 nm, such as in particular a spectral reflection curve, the lab values of the substrate or the like, wherein the substrate or target substrate may be selected from the same group of substrates described above. As an alternative or in addition to this, for example, its designation or trade name can also be entered for the substrate or the spectral curve can be measured or read in. The information about the respective substrates stored in the data sets of the database is preferably data of a spectral curve that has been obtained by recording a spectral curve of the relevant substrate with a spectrophotometer over a wavelength range from 180 to 4000 nm and preferably over a wavelength range from 400 to 700 nm. This is particularly preferably a spectral reflection curve recorded over a wavelength range from 180 to 4000 nm and preferably over a wavelength range from 400 to 700 nm, for which curve the overall reflection, total reflection, diffuse reflection or directional reflection can be measured. The measurement can take place, for example, at an angle of incidence/sensor measuring angle of 45°/0°, at 0°/45°, with diffuse irradiation/0°, with diffuse irradiation/8° or at other angles. In this embodiment of the present invention, the data of the spectral curve can be the reflection values for each nanometer between 180 and 4000 nm, preferably between 400 and 700 nm, the reflection values for every fifth nanometer between 180 and 4000 nm, preferably between 400 and 700 nm, the reflection values for every tenth nanometer between 180 and 4000 nm, preferably between 400 and 700 nm, or the reflection values at other distances.

In the context of the present invention, information about the color recipe stored in the data sets is understood to mean all types of information which uniquely characterize the color recipe. For example, this information can include details of all the individual components or raw materials contained in the color recipe, as well as their quantities. However, it is also possible to specify the color recipe as a mixture of semi-finished products, such as a mixture of one or more blends and one or more colorants. It is also possible to specify the color recipe as a mixture of finished products, such as a mixture of two or more colors. In these cases, the information includes the specification of all semi-finished products contained in the color recipe and their quantities or the specification of all finished products contained in the color recipe and their quantities. It is also possible to specify the color recipe as a mixture of individual components or raw materials and semi-finished products, as a mixture of individual components or raw materials and finished products, as a mixture of semi-finished products and finished products or as a mixture of individual components or raw materials, semi-finished products and finished products. Finally, it is also possible to specify the color recipe using a trade name or a code made up of combinations of letters and/or numbers.

According to a particularly preferred embodiment of the present invention, it is provided that at least one, preferably at least 10%, particularly preferably at least 50%, more preferably at least 80%, very particularly preferably at least 90% and most preferably all of the color recipes about which information is contained in the data sets of the database are composed of semi-finished products, namely preferably of at least one colorant and at least one non-coloring blend. These are particularly preferably composed of two to fifteen and particularly preferably two to ten semi-finished products. For example, it is preferred that these are composed of two to four colorants and a non-coloring blend. For example, further semi-finished products such as solvents or solvent mixtures, additives such as slip additives, wax additives or defoamers, adhesion promoters, photoinitiators, stabilizers, drying agents, hardeners or the like can be added to these coloring and non-coloring components. In this embodiment, the information about the color recipe stored in the data sets includes the specification of all semi-finished products contained in the color recipe and their quantities. The non-coloring blend can contain at least one component selected from the group consisting of binders, solvents, waxes, additives, reactive thinners, photoinitiators, hardeners and any combination of two or more of these compounds. The at least one colorant is preferably a pigment formulation in solid, liquid or paste form or a formulation containing one or more dyes in which one pigment or a mixture of two or more pigments is dispersed in solvent, binder or a mixture of solvent and binder. The colorant can contain, for example, at least one effect pigment which is preferably selected from the group consisting of metallic effect pigments, pearlescent pigments, mica coated with metal oxide, interference pigments, luminescent pigments, UV-absorbing pigments, IR-absorbing pigments, photochromic pigments, thermochromic pigments, piezo-electronic pigments, magnetic pigments, and any combination of two or more of the above pigment types. Alternatively, and/or in addition to this, non-effect pigments, such as colored pigments, white pigments, black pigments and/or dyes, can also be used. The at least one colorant preferably additionally contains one or more compounds selected from the group consisting of additives, reactive thinners, photoinitiators, hardeners and any combinations of two or more of the above compounds. For example, the at least one colorant can contain a dispersant as an additive.

According to an alternative embodiment of the present invention, it is provided that at least one, preferably at least 10%, particularly preferably at least 50%, more preferably at least 80%, very particularly preferably at least 90% and most preferably all of the color recipes about which information is contained in the data sets of the database are composed of finished products, namely preferably of two to fifteen colors and particularly preferably of two to ten colors. These can contain at least one effect pigment as a colorant, which is preferably selected from the group consisting of metallic effect pigments, pearlescent pigments, mica coated with metal oxide, interference pigments, luminescent pigments, UV-absorbing pigments, IR-absorbing pigments, photochromic pigments, thermochromic pigments, piezo-electronic pigments, magnetic pigments, and any combination of two or more of the above pigment types. Alternatively, and/or in addition to this, non-effect pigments and/or dyes can also be used.

According to a further, alternative embodiment of the present invention, it is provided that some of the color recipes about which information is contained in the data sets of the database are composed of finished products, namely preferably from two to five colors and possibly an additional color-neutral component such as a blend, whereas the other part of the color recipes is composed of semi-finished products, namely preferably two to ten semi-finished products.

The present invention is not limited with regard to the type of color recipes about which information is contained in the data sets of the database. Preferably at least one, preferably at least 10%, particularly preferably at least 50%, more preferably at least 80%, very particularly preferably at least 90% and most preferably all color recipes about which information is contained in the data sets of the database are selected from the group which consists of printing inks, color coatings, powder coatings, leather inks and textile inks.

The specification in step b) is preferably carried out by the user making entries in the computer program. In order to enable the user to enter the specification into the computer program in step b), it is proposed in a further development of the concept according to the invention that the computer program contains clickable pre-selections of the parameters to be entered, namely target application method, target substrate and target hue. As an alternative to this, the specification can also take place by transferring data, for example by transferring corresponding data from a file stored on a data carrier or in a computer to the computer program.

In order to enable the target application method to be specified in step b), it is preferred that the computer program contains clickable pre-selections of application methods from which the user can specify the target application method by clicking in step b). Alternatively, the computer program can be programmed in such a way that it enables the target application method to be entered as text or as numerical and/or text codes that identify the target application method.

In a further development of the concept according to the invention, it is proposed that the computer program be configured in such a way that the user can specify the target substrate in at least one and preferably all of the following ways in step b):
 i) transferring the data of a spectral curve recorded with a spectrophotometer between 180 and 4000 nm and preferably between 400 and 700 nm, preferably a spectral reflection curve and particularly preferably a spectral reflection curve of the target substrate measured as explained above, into the computer program, for example directly (i.e. without an interposed data carrier), from a DVD, a USB stick or the like,
 ii) clicking on the target substrate from a collection of pre-selections for different substrates stored in the computer program,
 iii) inputting the values of a spectral curve, preferably a spectral reflection curve and particularly preferably a spectral reflection curve of the target substrate measured as explained above, into the computer program, for example by entering the reflection values for the wavelengths between 180 and 4000 nm and preferably between 400 and 700 nm at 1 nm intervals, at 5 nm intervals, at 10 nm intervals or at other intervals as numbers,
 iv) entering or transferring the lab values of the target substrate or values of another color space, such as LUV values, RGB values, LCh values, XYZ values or the like, into the computer program.

It is likewise preferred that the computer program is configured in such a way that the user can specify the target hue in at least one and preferably all of the following ways in step b):
 i) transferring the data of a spectral curve recorded with a spectrophotometer between 180 and 4000 nm and preferably between 400 and 700 nm, preferably a spectral reflection curve and particularly preferably a spectral reflection curve of the target hue measured as explained above, into the computer program, for example directly (i.e. without an interposed data carrier), from a DVD, a USB stick or the like,
 ii) clicking on the target hue from a collection of pre-selections for different hues stored in the computer program,
 iii) entering or reading in the values of a spectral curve, preferably a spectral reflection curve and particularly preferably a spectral reflection curve of the target hue measured as explained above, into the computer program, for example by entering the reflection values for the wavelengths between 180 and 4000 nm and preferably between 400 and 700 nm at 1 nm intervals, at 5 nm intervals, at 10 nm intervals or at other intervals as numbers,
 iv) entering, reading in or transferring the lab values of the target hue or values of another color space, such as LUV values, RGB values, LCh values, XYZ values or the like, into the computer program.

According to the invention, in step c) the database is searched with a computer program to determine whether it contains at least one data set whose color recipe about which information is contained in the data set results, after application using the target application method specified in step b) to the target substrate specified in step b), in a color product with a hue which corresponds to the target hue specified in step b) or deviates from it at most with a specified tolerance. A tolerance is granted in order to take into account the fact that the human eye cannot perceive the slightest differences between two almost identical hues. Setting up a tolerance therefore increases the probability of a hit in step c) without having to accept unacceptable deviations from the specified target hue.

According to one embodiment of the present invention, a tolerance for step c) is preset in the computer program.

Alternatively, it can be provided that the user can enter the tolerance for step c) into the computer program. For this purpose, the computer program can be configured in such a way that it allows the tolerance to be set continuously, for example by entering a numerical value. It is also possible for the computer program to be designed in such a way that the user can set the tolerance in accordance with default settings specified in the computer program, for example by the user clicking on and selecting one of a plurality of tolerances specified by the computer program. It is also possible to combine both embodiments by configuring the computer program in such a way that the user can decide whether to set the tolerance in accordance with default settings specified in the computer program or, for example, by entering a numerical value.

In a further development of the concept according to the invention, it is proposed to set the maximum tolerance so that in step c) it corresponds to a Delta E value of a maximum of 2, preferably a maximum of 1 and particularly preferably a maximum of 0.5, regardless of whether this tolerance is preset in the computer program or is entered by the user. All common Delta E values can be used as Delta E values, such as the $\Delta E^*_{ab}$, the $\Delta E94$, the $\Delta E_{00}$, the DIN99, the DIN99$_o$, the CMC, the Lübbe, the Lübbe corrected, the CIECAM02. Preferably, the $\Delta E_{00}$ is used. In principle, two different hues with a deviation of the $\Delta E_{00}$ value of up to 1 corresponds to a very small hue deviation that can only be seen by a trained eye. Deviations in the $\Delta E_{00}$ value of up to 0.5 are considered normally not visible and deviations in the $\Delta E_{00}$ values of up to 0.2 can no longer be seen even by a trained eye.

According to a further preferred embodiment of the present invention, it is provided that in step d) only the color recipe which best results in the target hue is displayed. If in step c) two or more data sets are found whose color recipes about which information is contained in the data set result, after application using the target application method specified in step b) to the target substrate specified in step b), in a color product with a hue which corresponds to the target hue specified in step b) or deviates from it at most with a specified tolerance, therefore, according to this preferred embodiment, only that data set is displayed which results in a color product with a hue that least (i.e. with the lowest $\Delta E_{00}$ value) deviates from the target hue.

As explained above, the color recipe can in principle be given as a recipe for the quantities of all individual raw materials. However, since such color recipes are very complex, this means that the entire color has to be produced in a particularly logistically complex production process, since all raw materials must first be procured. Therefore, it is preferred that the color recipe is specified as a mixture of semi-finished products, such as a mixture of one or more blends and one or more colorants, or as a mixture of finished products, such as a mixture of several colors, optionally with additional blending. For this reason, it is preferred that in step d) the composition of the color recipe is indicated i) as a mixture of semi-finished products, preferably as a mixture of two to fifteen semi-finished products and particularly preferably as a mixture of two to ten semi-finished products, or ii) as a mixture of finished products, preferably as a mixture of two to fifteen finished products and particularly preferably as a mixture of two to ten finished products.

The display of the information about the color recipe stored in the at least one data set therefore includes in these embodiments the specification of the quantities and the designation of the individual semi-finished products or finished products from which the color recipe is composed.

In a further development of the concept according to the invention, it is proposed that the at least one reference hue of the at least one data set is also indicated in step d). The user can then use this for later quality control or save it, provided that he produces the color recipe, or pass it on to the service provider who has the color recipe made.

The at least one reference hue can be specified in any form which uniquely characterizes the reference hue. For example, the at least one reference hue can be indicated as lab values (or values of another color space, such as LUV values, RGB values, LCh values, XYZ values or the like), as a spectral curve (in particular a spectral reflection curve) between 180 and 4000 nm and preferably between 180 and 4000 nm or as data of a spectral curve (in particular a spectral reflection curve) between 180 and 4000 nm and preferably between 180 and 4000 nm.

The present invention is particularly suitable for the use of databases with a large number of data sets. The database used in the method according to the invention preferably comprises more than 10 data sets, more preferably more than 100 data sets, even more preferably more than 1,000 data sets, particularly preferably more than 10,000 data sets, particularly preferably more than 100,000 data sets, very particularly preferably more than 500,000 data sets and most preferably a million sets or more.

After displaying the hit found in step c) of the method according to the invention, the user can produce the color recipe found or have it produced by a service provider. In particular, in the event that the color recipe found in step c), according to the information contained in the database, after application using the target application method specified in step b) to the target substrate specified in step b), results in a color product with a hue that deviates from the target hue specified in step b) within a specified tolerance with, for example, a $\Delta E_{00}$ value of 0.5, it is advantageous if the user can visually look at the resulting hue before deciding whether or not to accept it and produce or have the color produced, without first having to make the color recipe. In order to enable this with as little effort as possible, it is provided according to a further particularly preferred embodiment of the present invention that the computer program comprises a test algorithm which can simulate or calculate a hue, wherein the simulated or calculated hue, printed out using a computer via a test printer different from the target application method specified in step b) on a test substrate, produces the same hue as the application of the color recipe found in step c) using the target application method specified in step b) onto the target substrate specified in step b). In this embodiment, the computer program is preferably configured so that the user can specify a test printer and a test substrate, for example by clicking on a corresponding test printer and test substrate in a list displayed by the computer program, or by entering a numerical and/or number code or the like that identifies the test printer and the test substrate. The test printer is preferably a customary and globally commercially available paper printer, a sheet-fed offset printing machine, a screen printing machine or a gravure printing machine. The test printer is particularly preferably a customary and globally commercially available paper printer, particularly preferably an at least 4-color paper printer and particularly preferably an at least 7-color paper printer. In this context, an at least 4-color paper printer means a 4-color paper printer, a 6-color paper printer or a paper printer comprising even more colors, and an at least 7-color paper printer in this context means a 7-color paper printer, an 8-color paper printer, a 9-color paper printer, or a paper printer comprising even more colors. In this way, specified hues can be reproduced very precisely. Common 4-color printers are typically based on the colors cyan, magenta, yellow and black. According to the present invention, a suitable at least 7-color printer preferably comprises the colors cyan, magenta, yellow, black, orange, violet and green. In particular, the test paper printer is a customary and globally commercially available inkjet printer or laser printer, and most preferably an at least 7-color inkjet printer. The test substrate is preferably a customary and globally commercially available inkjet printing or laser printing paper. This embodiment allows the user to simply and inexpensively look at and evaluate the hue that results when the color recipe displayed in step d) of the method according to the invention is applied to the target substrate using the target application method, without the color recipe displayed in step d) of the method according to the invention having to be applied to the target substrate, which may be expensive to procure under certain circumstances, using the target application method, which may be complex under certain circumstances. This is because the hue calculated with the test algorithm corresponds to the hue that results when the color recipe displayed in step d) is applied to the target substrate using the target application method. This embodiment of the present invention therefore allows the user to check particularly easily and quickly whether the color recipe indicated in step d) is the correct one for his needs. If it is the right one, he can order it from a suitable manufacturer who can quickly and easily subject the color recipe produced as set out above in detail to quality control by applying the color recipe using the reference application method on a reference substrate and matching the hue obtained with the reference hue that differs from the target hue and test hue, so that it is not necessary in quality control to apply the color recipe indicated in step d) of the method according to the invention to the target substrate using the target application method. This embodiment is therefore particularly advantageous if the target application method is very complex and expensive and the target substrate is complex and expensive to procure.

Often the color product aimed for by the user is not just a substrate provided with a color, but, for example, a corresponding color product in which, after the color recipe has been applied to the specified substrate using the specified application method, a topcoat or primer has been applied. If the topcoat or primer is not color-neutral, such as in the case of matte paints, effect paints, haptic paints, scented paints, it changes the hue of the color product at least slightly. Even if the topcoat or primer is neutral in color, the topcoat or primer affects the gloss of the color product. In order to take these effects into account in the method, it is preferred that at least some of the data sets, such as at least 10% and preferably at least 30% of the data sets also contain specifications about an overcoat or primer, wherein the hue stored in the relevant data set is the one of the color product which is obtained by printing the color recipe stored in the data set using the application method stored in the data set onto the substrate stored in the data set and then applying the overcoat or primer stored in the data set. This ensures that, even if a topcoat or primer is used, the method according to the invention ascertains a color recipe which, with the specified tolerance, results in the desired hue for the color product containing the topcoat or primer.

For the above reasons, it is preferred that the computer program used in the method according to the invention is configured so that the user can specify a topcoat or primer and an amount for the topcoat or primer to be applied in step b) and the database is searched in step c) to see whether it contains at least one data set whose stored color recipe results in the specified hue with a specified maximum tolerance when the color recipe stored in the data set is applied to the target substrate specified in step b) using the target application method specified in step b) and then the overcoat or primer specified in step b) is applied in the specified amount.

This embodiment is also particularly preferred for printing inks, in which case the overcoat is an overcoat varnish, the application method is a printing method, and the substrate is paper, cardboard, sheet metal or a plastics film.

In addition to printing inks, the method according to the invention is also particularly suitable for leather and textile dyeing processes, so that the application method can in particular be a leather dyeing process or a textile dyeing process and the substrate can be a leather or a textile.

According to a further particularly preferred embodiment of the present invention, it is provided that at least 10%, preferably at least 25%, more preferably at least 50%, even more preferably at least 75%, very particularly preferably at least 90% and most preferably all of the data sets also contain information about at least one of the following characteristics, from which the user can choose:
  i) one or more halftones of the color product,
  ii) gloss level of the color product,
  iii) different gloss levels at different viewing angles of the color product,
  iv) haptic (i.e. tactilely perceptible) properties of the color product,
  v) scratch-resistance of the color product,
  vi) tear strength of the color product,
  vii) tensile strength of the color product,
  viii) resistance of the color product to light,
  ix) resistance of the color product to temperature,
  x) resistance of the color product to gamma rays,
  xi) resistance of the color product to chemicals,
  xii) resistance of the color product to pasteurization,
  xiii) resistance of the color product to sterilization,
  xiv) resistance of the color product to moisture,
  xv) resistance of the color product to delamination,
  xvi) absence of certain ingredients in the color recipe,
  xvii) opacity of the color product,
  xviii) slipping properties of the color product.

The color product is, in turn, the product that is obtained by applying the color recipe about which information is contained in the corresponding data set to the substrate about which information is contained in the corresponding data set using the application method about which information is contained in the corresponding data set.

According to a further embodiment of the present invention, the application method is a textile dyeing process for which it is provided that at least 10%, preferably at least 25%, more preferably at least 50%, even more preferably at least 75%, very particularly preferably at least 90% and most preferably all of the data sets also contain information about at least one of the following characteristics:
  i) anti-static finish,
  ii) flame-retardant finish,
  iii) water repellency,
  iv) oil repellency,
  v) hydrophilization,
  vi) fixation,
  vii) finishing,
  viii) conditioning,
  ix) coating with wax,
  x) coating with fluorocarbon resins,
  xi) fastness to light,
  xii) wash-resistance,
  xiii) fastness to rubbing.

According to a further embodiment of the present invention, the application method is a leather dyeing process for which it is provided that at least 10%, preferably at least 25%, more preferably at least 50%, even more preferably at least 75%, very particularly preferably at least 90% and most preferably all of the data sets also contain information about at least one of the following characteristics:
  i) polyurethane dressing,
  ii) aniline dressing,
  iii) nitrocellulose dressing,
  iv) impregnation,
  v) embossing,
  vi) oil dressing,
  vii) wax dressing,
  viii) coating (oil coating),
  ix) coating (cold coating),
  x) fastness to light,
  xi) fastness to rubbing,
  xii) dirt repellency,
  xiii) gloss.

These last three embodiments make it possible, with the method according to the invention, not only to ascertain a color recipe which, when applied to the desired target substrate using the desired target application method, results in a color product with the desired target hue, but in particular also to ascertain a corresponding color recipe which has the desired additional properties such as a desired chemical resistance, and leads to a desired gloss of the color product or the like.

To implement this embodiment, it is also preferred that the computer program used in the method according to the invention is configured so that the user can additionally specify in step b) at least one of the characteristics i) to xviii) for printing methods, or i) to xiii) for textiles and leather.

In order to achieve the advantages for this embodiment to a greater extent, it is proposed in a further development of the concept according to the invention that at least 10%, preferably at least 25%, more preferably at least 50%, even more preferably at least 75%, very particularly preferably at least 90% and most preferably all of the data sets also contain information about at least three, preferably at least five, particularly preferably at least 10, very particularly preferably at least 15 and most preferably all of the characteristics i) to xviii), and preferably the user can specify this in step b).

In a further development of the concept according to the invention, it is proposed that at least 10%, preferably at least 50%, particularly preferably at least 80%, more preferably at least 90%, very particularly preferably at least 95% and most preferably all of the data sets contained in the database at three different angles, preferably at 20°, at 60° and at 85°, but at least at 60° in relation to the surface of the color product, contain certain gloss values, and that the user can specify in step b) values for the target gloss values to be achieved at the three different angles for the color product. In this embodiment, it is particularly preferred that the gloss values are graded at least between glossy, semi-matte and matte. For example, matte paints can have gloss values between 0 and 24, semi-matte paints can correspond to gloss values between 25 and 50, and gloss paints can correspond to gloss values above 51.

The gloss values are measured in accordance with DIN 67530/ISO 2813 and the paints are applied, for example, with a 6-μm doctor blade.

According to a further very particularly preferred embodiment of the present invention, it is provided that at least 10%, preferably at least 50%, particularly preferably at least 80%, more preferably at least 90%, very particularly preferably at least 95% and most preferably all of the data sets contained in the database include information about at least one halftone, this information containing at least information about the hue that the color product has, which is obtained when the color recipe about which information is stored in the corresponding data set is applied to the target substrate as a halftone using the target application method. This enables a statement to be made about how the desired hue appears in the full tone and in the individual gradations/halftones or which spectral curves result accordingly. This is preferred in order to be able to distinguish visually as well as spectrally identical hues, which have been mixed from several different pigment combinations, in the halftones. The full tones can appear the same visually and spectrally, but different hues/color locations are obtained in the halftones if different pigment combinations are present.

In this embodiment, it is particularly preferred that the corresponding data sets include corresponding information about at least two halftones, preferably about at least 4 halftones and particularly preferably at least 6 halftones, wherein the information about each of the at least two halftones contains at least information about the relevant hue that the relevant color product has, which is obtained when the color recipe about which information is stored in the corresponding data set is applied to the target substrate as the relevant halftone using the target application method. The halftones about which information is contained in the relevant data set preferably cover at least 25%, particularly preferably at least 50%, very particularly preferably at least 75% and most preferably the entire halftone range.

To implement this embodiment, it is also preferred that the computer program used in the method according to the invention is configured in such a way that the user can specify (measure, read in) values both for the full tone and for at least one halftone in step b).

In particular at the beginning of the construction of the database used for the method according to the invention, at which it does not yet contain data sets for all possible combinations of application method, substrate and hue, along with any other optional characteristics i) to xviii) for printing methods, or i) to xiii) for textiles and leather, it will be inevitable that for a special combination of target application method, target substrate and target hue entered in step b), no suitable data set is found in method step c). In order to also provide the user with a color recipe in this case with which he can carry out his desired project, it is proposed in a further development of the concept according to the invention that the computer program includes a recipe algorithm which allows a color recipe to be calculated which, after the application using the target application method specified in step b) of the method according to the invention on the target substrate specified in step b) of the method according to the invention, results in the specified hue for the target color product with a specified maximum tolerance.

The computer program is preferably configured in such a way that the recipe algorithm which calculates the color recipe is carried out if no suitable data set was found in step c).

Furthermore, it is preferred that, before the recipe algorithm calculating the color recipe is carried out, appropriate components for the color recipe are transferred from the computer program to the recipe algorithm based on the specifications of the user, from which the recipe algorithm alone calculates the color recipe. Components for the color recipe are understood to mean raw materials, semi-finished products and/or finished products that are stored in the database together with their properties and color properties. This embodiment makes it possible to calculate a color recipe with which the user not only receives the desired hue, but which in particular also fulfills the further specified characteristics, such as one or more of the characteristics i) to xviii) for printing methods, or i) to xiii) for textiles and leather. If, for example, the user specifies a certain chemical resistance to be achieved, for example to acids, in step b), the computer program only transfers those components, i.e. raw materials, semi-finished products and/or finished products, to the recipe algorithm that have this chemical resistance.

In the above embodiment of the present invention, it is also preferred that the components for the color recipe transferred from the computer program to the recipe algorithm in particular meet at least one, preferably at least three, more preferably at least five, particularly preferably at least ten, very particularly preferably at least fifteen and most preferably all of the criteria i) to xviii) specified by the user for printing methods, or i) to xiii) for textiles and leather.

According to a further very particularly preferred embodiment of the present invention, it is provided that at least 10%, preferably at least 20%, particularly preferably at least 40%, more preferably at least 60%, very particularly preferably at least 80% and most preferably all of the data sets also include information about the spectral curve of the surface of a first production color product which has been obtained by, for example, spread coating a part of a first production batch of the color recipe indicated in step d) onto a white coated paper, and recording a spectral curve, particularly preferably a spectral reflection curve between 180 and 4000 nm, preferably between 400 and 700 nm of the surface thereof with a spectrophotometer. In addition to spread coating, the first production batch can also be applied to the substrate, preferably paper, using any other application method, such as, for example, laboratory proofing or doctor blade strokes. This embodiment facilitates quality control for each further production batch produced. For each further production batch, a part of the further production batch of the color recipe can then be spread coated onto the same coated paper for quality control and a spectral curve can be recorded from the surface of the color product obtained in this way under the same conditions as for the first production batch. The spectral curve obtained in this way then only has to be compared with the spectral curve stored in the data set. If the deviation obtained from this comparison is within a specified tolerance range, the batch can be released. Otherwise, this must be corrected by adding one or more components until a hue within the tolerance range is obtained for a reference color product manufactured therewith.

In a further development of the concept according to the invention, it is proposed that in this embodiment at least 10%, more preferably at least 20%, particularly preferably at least 40%, even more preferably at least 60%, very particularly preferably at least 80% and most preferably all of the data sets also comprise the spectral curve of the surface of a second production color product, which has been obtained by, for example, spread coating a part of a second production batch of the color recipe indicated in step d) onto a white coated paper and recording a spectral curve between 180 and 4000 nm, preferably between 400 and 700 nm of the surface thereof with a spectrophotometer. In addition to spread coating, the second production batch can also be applied to the substrate, preferably paper, using any other application method, such as, for example, laboratory proofing or doctor blade strokes.

In addition, it is preferred in this embodiment of the present invention that the data sets include, in addition to the spectral curve of the second production color product, the spectral curve of a color product produced with a reserve sample of the first production batch, which has been obtained by spread coating a part of a reserve sample of the first production batch of the color recipe indicated in step d) onto a white coated paper, and recording a spectral curve between 180 and 4000 nm, preferably between 400 and 700 nm of the surface thereof with a spectrophotometer at the same time as the spread coating and recording of the spectral curve of the part of the second production batch of the color recipe indicated in step d). By spread coating both samples onto the same white coated paper at the same time and comparing them, the accuracy of the quality control can be further increased.

Another object of the present invention is a database for ascertaining a color recipe which, after application using a specified application method on a specified substrate, results in a color product with a specified hue, wherein a plurality of data sets is stored in the database, wherein each of the data sets comprises at least information about a color recipe, about a substrate, about an application method and about the hue of the color product resulting after the application of the color recipe using the application method on the substrate. According to the invention, at least one of the data sets also includes information about at least one reference hue, one reference application method and one reference substrate, wherein the reference hue is obtained when the color recipe about which information is contained in the data set is applied to the reference substrate specified in the data set using the reference application method, wherein the reference application method is different from the application method about which information is contained in the data set, and/or the reference substrate is different from the substrate about which information is contained in the data set.

The database preferably comprises more than 10 data sets, more preferably more than 100 data sets, even more preferably more than 1,000 data sets, particularly preferably more than 10,000 data sets, particularly preferably more than 100,000 data sets, very particularly preferably more than 500,000 data sets and most preferably one million data sets or more.

In a further development of the concept according to the invention, it is proposed that at least 10%, preferably at least 50%, particularly preferably at least 80%, more preferably at least 90%, very particularly preferably at least 95% and most preferably all of the data sets include information about at least one reference hue.

Another object of the present invention is a system for ascertaining a color recipe which, after the application using a specified application method on a specified substrate, results in a color product with a specified hue, in particular for performing the above-described method, the system comprising:
  a) a previously described database,
  b) a computer program which is programmed in such a way that it allows a user to enter a target application method, a target substrate and a desired target hue for the obtained color product resulting after the application of a color recipe using the specified target application method on the specified target substrate into the computer program,
  c) wherein the computer program is also programmed so that it can search the database in order to ascertain whether the database contains at least one data set whose color recipe, about which information is contained in the data set, after the application using the target application method specified in step b) on the target substrate specified in step b) results in a color product with a hue which corresponds to the target hue specified in step b) or deviates from it at most by a specified tolerance, and
  d) wherein the computer program is also programmed in such a way that, if at least one suitable data set is found in step c), it displays to the user the information about the color recipe stored in the at least one data set.

What is claimed is:

1. A method for ascertaining a color recipe and for the quality control of the produced color recipe which, after application using a specified application method on a specified substrate, results in a color product with a specified hue, the method comprising:
  a) Providing a database in which a multiplicity of data sets are stored, wherein each of the data sets in each case comprises at least information about a color recipe, about a substrate, about an application process and about the hue of the color product resulting after the application of the color recipe using the application process on the substrate,
  b) Specification by a user of a target application method, of a target substrate and of a desired target hue that results for the obtained color product after the application of a color recipe using the specified target application method on the specified target substrate,
  c) Searching the database with a computer program to see whether it contains at least one data set whose color recipe, about which information is contained in the data set, after application using the target application method specified in step b) onto the target substrate specified in step b), results in color product with a hue which corresponds to the target hue specified in step b) or deviates from it at most by a specified tolerance, and
  d) if at least one suitable data set is found in step c), displaying the information about the color recipe stored in the at least one data set,
  characterized in that at least 80% of the data sets also includes information about at least one reference hue, a reference application method and a reference substrate, wherein the reference hue is obtained when the color recipe about which information is contained in the data set is applied to the reference substrate specified in the data set using the reference application method, wherein the reference application method is different from the application method about which information is contained in the data set, and/or the reference substrate is different from the substrate about which information is contained in the data set, wherein the reference substrate is a standard paper as specified in the DIN ISO 2846-1: 2017, and wherein at least 80% of all datasets also include information about the spectral curve of the surface of a first production color product which has been obtained by applying a part of a first production batch of the color recipe indicated in step d) onto a white coated paper, and recording a spectral curve between 400 and 700 nm of the surface thereof with a spectrophotometer;
and wherein the method further comprises:
- e) manufacturing the color recipe and i) applying the so manufactured color recipe onto the standard paper using the reference application method and then comparing the hue of the reference color product manufactured in this way with the reference hue about which information is contained in the data set, or, if at least 80% of all datasets also include information about the spectral curve of the surface of a first production color product, ii) coating the so manufactured color recipe onto the same white coated paper, recording from the surface of the so obtained color product a spectral curve between 400 and 700 nm with a spectrophotometer and comparing the so obtained spectral curve with the spectral curve being stored in the dataset.

2. The method according to claim 1, characterized in that at least 90%, of the data sets include information about at least one reference hue and the associated reference application method and the associated reference substrate.

3. The method according to at least claim 1, characterized in that the information about the at least one reference hue includes data of a spectral curve that has been obtained by applying the color recipe stored in the respective data set using the reference application method to the reference substrate and then recording a spectral curve of the surface of the color product thus obtained with a spectrophotometer over a wavelength range from 180 to 4000 nm.

4. The method according to claim 1, characterized in that at least one of the application methods about which information is included in the data sets of the database, of the target application method specified in step b) and the at least one reference application method from the printing process, leather dyeing process, textile dyeing process, painting, rolling, brushing, spraying, dipping, flooding, glazing, powder coating, enamelling and any combination of two or more of the above methods are selected from the group consisting of flat printing, gravure printing, flexographic printing, digital printing, screen printing, letterpress printing, pad printing, transfer printing, sublimation printing, collotype printing, leather dyeing processes, textile dyeing processes and any combination of two or more of the above methods.

5. The method according to claim 1, characterized in that at least one of the substrates about which information is stored in the data sets of the database, the target substrates specified in step b) and the at least one reference substrate from paper, cardboard, paperboard, plastic film, leather, textile, metal, wood, glass, ceramic, skin, metallized surfaces, concrete, plastic bodies, laminates, composite materials and any combination of two or more of the above substrates are selected from the group consisting of newsprint, uncoated paper, coated paper, cardboard, paperboard, corrugated cardboard, plastic film, felt, nonwovens, laminates made of plastic and aluminum foil, leather, textile and any combination of two or more of the above substrates.

6. The method according to claim 1, characterized in that
- i) in step d) the composition of the color recipe i) is indicated as a mixture of semi-finished products or ii) as a mixture of finished products, or iii) is indicated as a mixture of semi-finished products with finished products or iv) is indicated as a mixture of semi-finished products with individual components or v) is indicated as a mixture of finished products with individual components or vi) is indicated as a mixture of semi-finished products, finished products and individual components or vii) is indicated as a mixture of individual components. and/or,
- ii) at least one of data sets comprises information about the color recipe and further comprises specifications about the individual components contained therein and their quantities and/or information on the semi-finished products contained therein and their quantities and/or information on the finished products contained therein and their quantities.

7. The method of claim 1, wherein the computer program is configured in such a way that the user can specify the target substrate in at least one of the following ways in step b):
- i) Transferring the data of a spectral curve of the target substrate recorded with a spectrophotometer between 180 and 4000 nm into the computer program,
- ii) Clicking on the target substrate from a collection of pre-selections for different substrates stored in the computer program,
- iii) Entering or reading in the values of a spectral curve of the target substrate,
- iv) Entering or reading in the lab values of the target substrate, and/or the user can specify the target hue in at least one of the following ways in step b):
- i) Transferring the data of a spectral curve of the target hue recorded with a spectrophotometer between 180 and 4000 nm into the computer program,
- ii) Clicking on the target hue from a collection of pre-selections for different hues stored in the computer program,
- iii) Entering or reading in the values of a spectral curve of the target hue,
- iv) Entering or reading in the lab values of the target hue.

8. The method according to claim 1, characterized in that a tolerance for step c) is preset in the computer program and/or the user can set the tolerance for step c) continuously or according to default settings, wherein the maximum tolerance in step c) corresponds to a $\Delta E_{00}$ value of at most 1.

9. The method according to claim 1, characterized in that the computer program comprises a test algorithm which can calculate a hue, wherein the calculated hue is printed out on a test paper substrate using a computer using a test paper printer different from the target application method specified in step c) results in the same hue as the application of the color recipe found in step c) using the target application method specified in step b) onto the target substrate specified in step b).

10. The method according to claim 9, characterized in that the computer program is configured in such a way that the user can specify a test paper printer and a test paper substrate.

11. The method according to claim 9, characterized in that the computer program is configured so that the test paper printer is at least a 4-color paper printer.

12. The method according to claim 1, characterized in that at least 10%, of the data sets also contain information about at least one of the following characteristics, from which the user can choose:
   i) one or more halftones,
   ii) gloss level of color product,
   iii) different levels of gloss at different viewing angles of the color product,
   iv) haptic properties of the color product,
   v) scratch-resistance of the color product,
   vi) tear strength of the color product,
   vii) tensile strength of the color product,
   viii) resistance of the color product to light,
   ix) resistance of the color product to temperature,
   x) resistance of the color product to gamma rays,
   xi) resistance of the color product to chemicals,
   xii) resistance of the color product to pasteurization,
   xiii) resistance of the color product to sterilization,
   xiv) resistance of the color product to moisture,
   xv) resistance of the color product to delamination,
   xvi) absence of certain ingredients in the color recipe,
   xvii) opacity of the color product,
   xviii) slipping properties of the color product.

13. The method according to claim 1, characterized in that the computer program comprises a recipe algorithm which allows a color recipe to be calculated which, after the application using the target application method specified in step b) of the inventive method on the target substrate specified in step b) of the inventive method, results in the specified hue for the target color product with a specified maximum tolerance, wherein the computer program is configured so that the recipe algorithm calculating the color recipe is carried out if no suitable data set was found in step c), and, before the execution of the recipe algorithm that calculates the color recipe based on the specifications of the user, appropriate components for the color recipe are transferred from the computer program to the recipe algorithm based on the specifications of the user, from which components the recipe algorithm alone calculates the color recipe.

* * * * *